US008182339B2

United States Patent
Anderson et al.

(10) Patent No.: US 8,182,339 B2
(45) Date of Patent: May 22, 2012

(54) WAGERING GAME MACHINE WITH THREE-DIMENSIONAL WAGERING GAME EFFECTS

(75) Inventors: Peter R. Anderson, Glenview, IL (US); Marwan Ansari, Plainfield, IL (US); Jeremy Hornik, Chicago, IL (US); Joel R. Jaffe, Glenview, IL (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 411 days.

(21) Appl. No.: 12/514,889

(22) PCT Filed: Nov. 13, 2007

(86) PCT No.: PCT/US2007/023768
§ 371 (c)(1),
(2), (4) Date: May 14, 2009

(87) PCT Pub. No.: WO2008/060517
PCT Pub. Date: May 22, 2008

(65) Prior Publication Data
US 2010/0029361 A1    Feb. 4, 2010

Related U.S. Application Data

(60) Provisional application No. 60/865,835, filed on Nov. 14, 2006.

(51) Int. Cl.
*A63F 13/00*    (2006.01)
(52) U.S. Cl. .............................................. 463/30; 705/28
(58) Field of Classification Search .............. 463/30–33
See application file for complete search history.

(56) References Cited

U.S. PATENT DOCUMENTS

| | | | |
|---|---|---|---|
| 2002/0125318 A1* | 9/2002 | Tatsuta et al. | 235/454 |
| 2004/0104935 A1* | 6/2004 | Williamson et al. | 345/757 |
| 2005/0075167 A1* | 4/2005 | Beaulieu et al. | 463/32 |
| 2005/0233799 A1* | 10/2005 | LeMay et al. | 463/20 |

OTHER PUBLICATIONS

"International Application Serial No. PCT/US2007/023768 Search Report mailed May 20, 2008", 4 pgs.
"International Application Serial No. PCT/US2007/023768 Written Opinion mailed May 20, 2008", 7 pgs.
"International Application Serial No. PCT/US2007/23768, International Preliminary Examination Report Mailed on Mar. 3, 2009", 10 pgs.

* cited by examiner

*Primary Examiner* — Thomas L Dickey
(74) *Attorney, Agent, or Firm* — Schwegman, Lundberg & Woessner, P.A.

(57) ABSTRACT

Systems and methods provide three-dimensional transformations on graphical images. The transformations may vary in accordance with various wagering game functions.

34 Claims, 14 Drawing Sheets

Baseline Image

Edge Detection

Gaussian Blur Filter

Transition Effects

Funhouse mirro

Shower Door

Two Point Ripple Shader

5x5 Kuwahara

Edge Detection with Flashlight Shader

WAGERING GAME MACHINE WITH THREE-DIMENSIONAL WAGERING GAME EFFECTS

RELATED APPLICATION

This patent application is a U.S. National Stage Filing under 35 U.S.C. 371 from International Patent Application Serial No. PCT/US2007/023768 filed Nov. 13, 2007, and published on May 22, 2008, as WO 2008/060517 A2 and republished as WO 2008/060517 A3, which claims the priority benefit of U.S. Provisional Patent Application Ser. No. 60/865,835, filed Nov. 14, 2006 and entitled "WAGERING GAME MACHINE WITH THREE-DIMENSIONAL WAGERING GAME EFFECTS", the contents of which are incorporated herein by reference in their entirety.

FIELD

The embodiments relate generally to wagering game machines and more particularly to providing three-dimensional effects on wagering game machines.

Limited Copyright Waiver

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright© 2005-2007 WMS Gaming Inc. All Rights Reserved.

BACKGROUND

Wagering game machine makers continually provide new and entertaining games. One way of increasing entertainment value associated with casino-style wagering games (e.g., video slots, video poker, video blackjack, and the like) includes offering a variety of base games and bonus events. However, despite the variety of base games and bonus events, players often lose interest in repetitive wagering game content. In order to maintain player interest, wagering game machine makers frequently update wagering game content with new game themes, game settings, bonus events, game software, and other electronic data. Further, entertainment value may be increased by providing an enhanced visual game play experience

DETAILED DESCRIPTION

Figure 1:
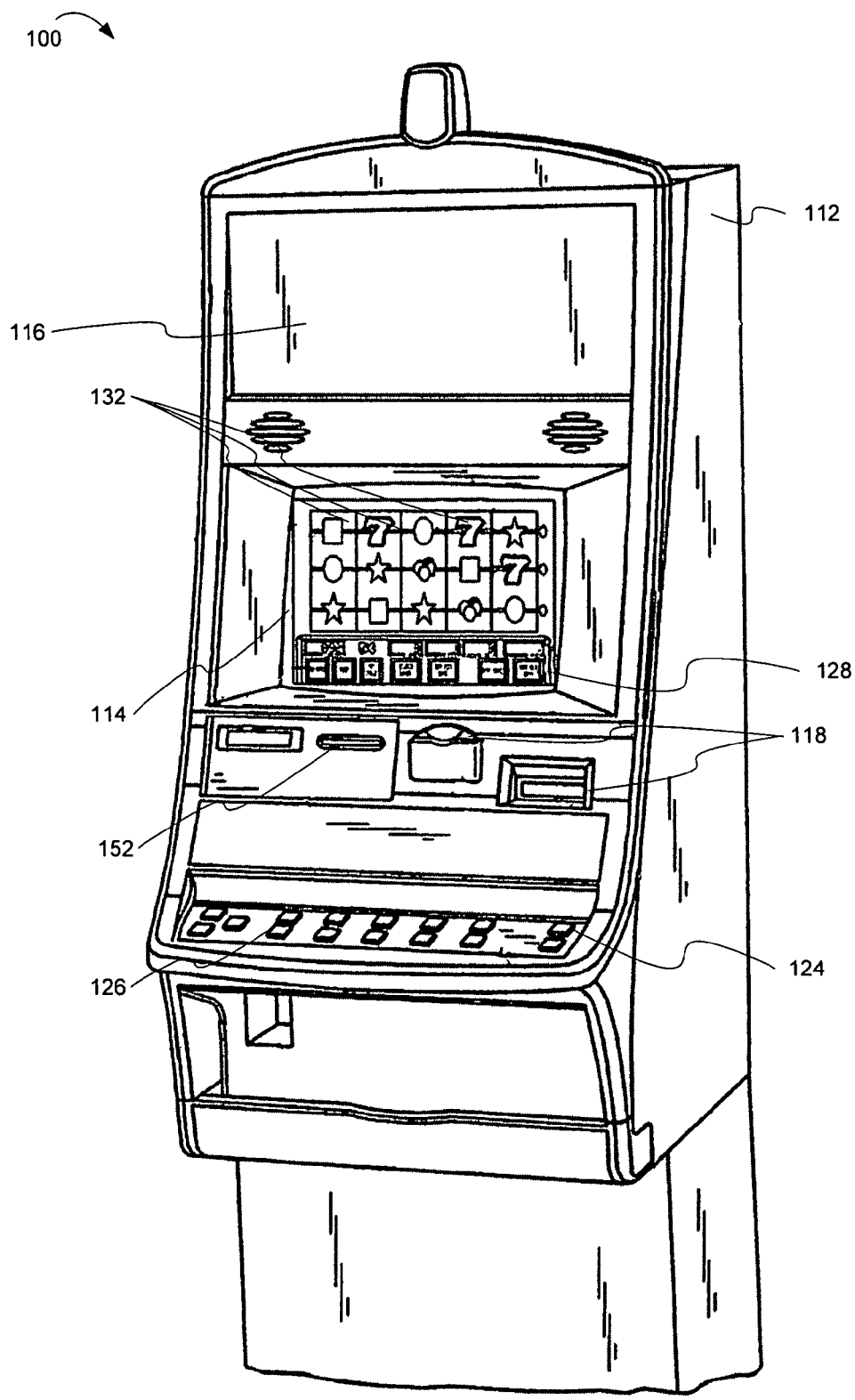
FIG. 1 is a perspective view of a wagering game machine, according to example embodiments of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

In general, the embodiments of the invention provide three-dimensional effects for various aspects of a wagering game presented on a wagering game machine.

Example Wagering Game Machine

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model. Further, in some embodiments, the wagering game machine 100 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

Example Portable Wagering Game Machine

Figure 2:
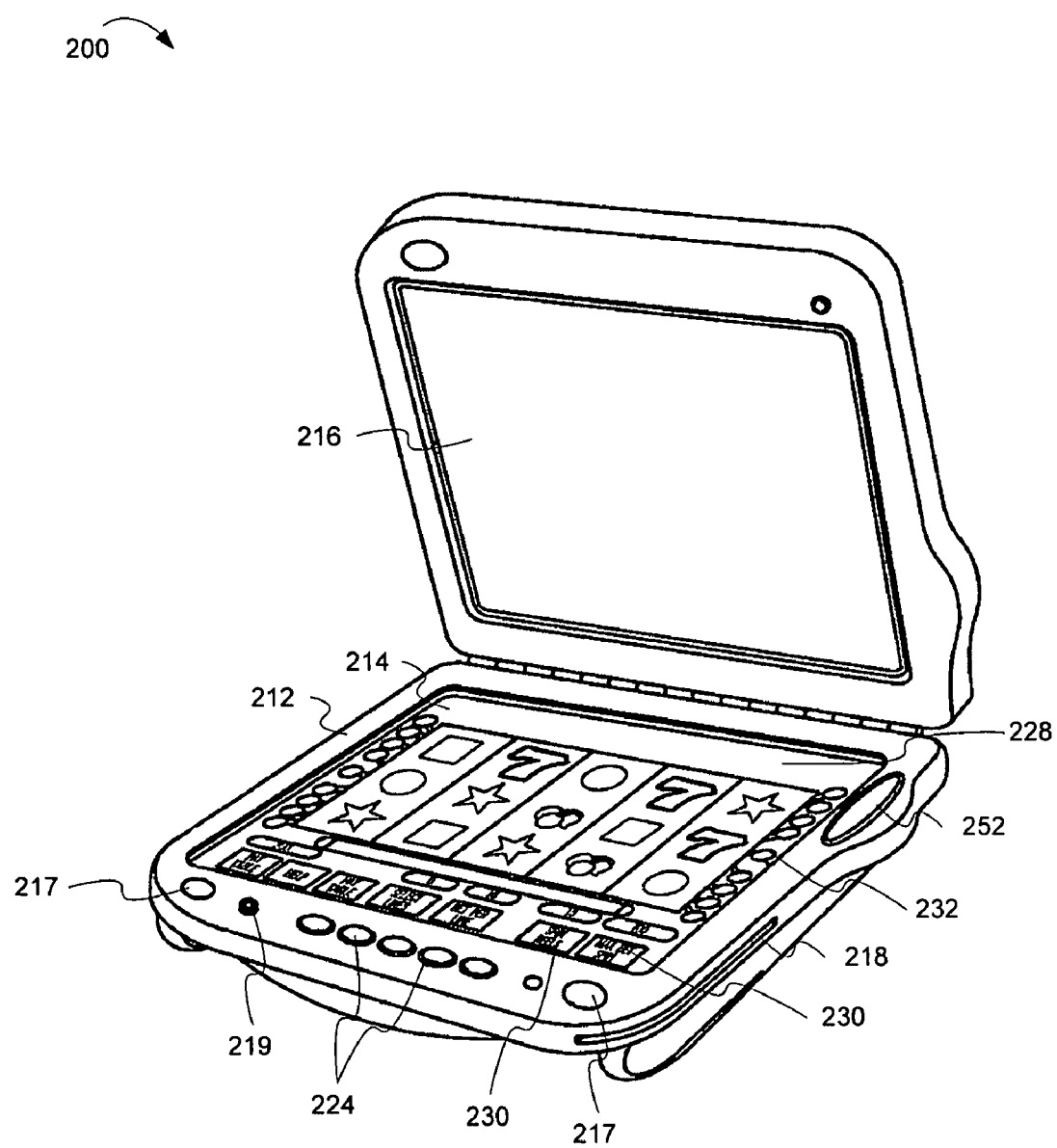
FIG. 2 is a perspective view of a portable wagering game machine according to an example embodiment.

FIG. 2 shows an example embodiment of a portable wagering game machine 200. The portable wagering game machine 200 can include any suitable electronic handheld or mobile device configured to play a video casino game such as blackjack, slots, keno, poker, blackjack, and roulette. The wagering game machine 200 comprises a housing 212 and includes input devices, including a value input device 218 and a player input device 224. For output, the wagering game machine 200 includes a primary display 214, and may include a secondary display 216, one or more speakers 217, one or more player-accessible ports 219 (e.g., an audio output jack for headphones, a video headset jack, etc.), and other conventional I/O devices and ports, which may or may not be player-accessible. In the embodiment depicted in FIG. 2, the wagering game machine 200 includes a secondary display 216 that is rotatable relative to the primary display 214. The optional secondary display 216 can be fixed, movable, and/or detachable/attachable relative to the primary display 214. Either the primary display 214 and/or secondary display 216 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 218 can comprise, for example, a slot located on the front, side, or top of the casing 212 configured to receive credit from a stored-value card (e.g., casino card, smart card, debit card, credit card, etc.) inserted by a player. The player-accessible value input device 218 can also comprise a sensor (e.g., an RF sensor) configured to sense a signal (e.g., an RF signal) output by a transmitter (e.g., an RF transmitter) carried by a player. The player-accessible value input device 218 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 200.

Still other player-accessible value input devices 218 can require the use of touch keys 230 on the touch-screen display (e.g., primary display 214 and/or secondary display 216) or player input devices 224. Upon entry of player identification information and, preferably, secondary authorization information (e.g., a password, PIN number, stored value card number, predefined key sequences, etc.), the player can be permitted to access a player's account. As one potential optional security feature, the wagering game machine 200 can be configured to permit a player to only access an account the player has specifically set up for the wagering game machine 200. Other conventional security features can also be utilized to, for example, prevent unauthorized access to a player's account, to minimize an impact of any unauthorized access to a player's account, or to prevent unauthorized access to any personal information or funds temporarily stored on the wagering game machine 200.

The player-accessible value input device 218 can itself comprise or utilize a biometric player information reader which permits the player to access available funds on a player's account, either alone or in combination with another of the aforementioned player-accessible value input devices 218. In an embodiment wherein the player-accessible value input device 218 comprises a biometric player information reader, transactions such as an input of value to the wagering game machine 210, a transfer of value from one player account or source to an account associated with the wagering game machine 200, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 218 comprising a biometric player information reader can require a confirmatory entry from another biometric player information reader 252, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 218 can be provided remotely from the wagering game machine 210.

The player input device 224 may include a plurality of push buttons on a button panel for operating the wagering game machine 200. In addition, or alternatively, the player input device 224 can comprise a touch screen mounted to the primary display 214 and/or secondary display 216. In one aspect, the touch screen is matched to a display screen having one or more selectable touch keys 230 selectable by a user's touching of the associated area of the screen using a finger or a tool, such as a stylus pointer. A player enables a desired function either by touching the touch screen at an appropriate touch key 230 or by pressing an appropriate push button on the button panel. The touch keys 230 can be used to implement the same functions as push buttons. Alternatively, the push buttons 226 can provide inputs for one aspect of the operating the game, while the touch keys 230 can allow for input needed for another aspect of the game. The various components of the wagering game machine 200 can be connected directly to, or contained within, the casing 212, as seen in FIG. 2, or can be located outside the casing 212 and connected to the casing 212 via a variety of wired (tethered) or wireless connection methods. Thus, the wagering game machine 200 can comprise a single unit or a plurality of interconnected (e.g., wireless connections) parts which can be arranged to suit a player's preferences.

The operation of the basic wagering game on the wagering game machine 200 is displayed to the player on the primary display 214. The primary display 214 can also display a bonus game associated with the basic wagering game. The primary display 214 preferably takes the form of a high resolution LCD, a plasma display, an LED, or any other type of display suitable for use in the wagering game machine 200. The size of the primary display 214 can vary from, for example, about a 2-3" display to a 15" or 17" display. In at least some embodiments, the primary display 214 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 214 and/or secondary display 216 can have a 16:9 aspect ratio or other aspect ratio (e.g., 4:3). The primary display 214 and/or secondary display 216 can also each have different resolutions, different color schemes, and different aspect ratios.

A player typically begins play of the basic wagering game on the wagering game machine 200 by making a wager (e.g., via the value input device 218 or an assignment of credits stored on the portable wagering game machine 200 via the touch screen keys 230, player input device 224, or buttons 226) on the wagering game machine 200. In some embodiments, the basic game can comprise a plurality of symbols arranged in an array, and includes at least one payline 232 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 218 of the wagering game machine 200 can double as a player information reader 252 that allows for identification of a player by reading a card with information indicating the player's identity (e.g., reading a player's credit card, player ID card, smart card, etc.). The player information reader 252 can alternatively or also comprise a bar code scanner, RFID transceiver or computer readable storage medium interface. In one embodiment, the player information reader 252 comprises a biometric sensing device.

In some embodiments, a portable wagering game machine 200 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

Figure 3A:
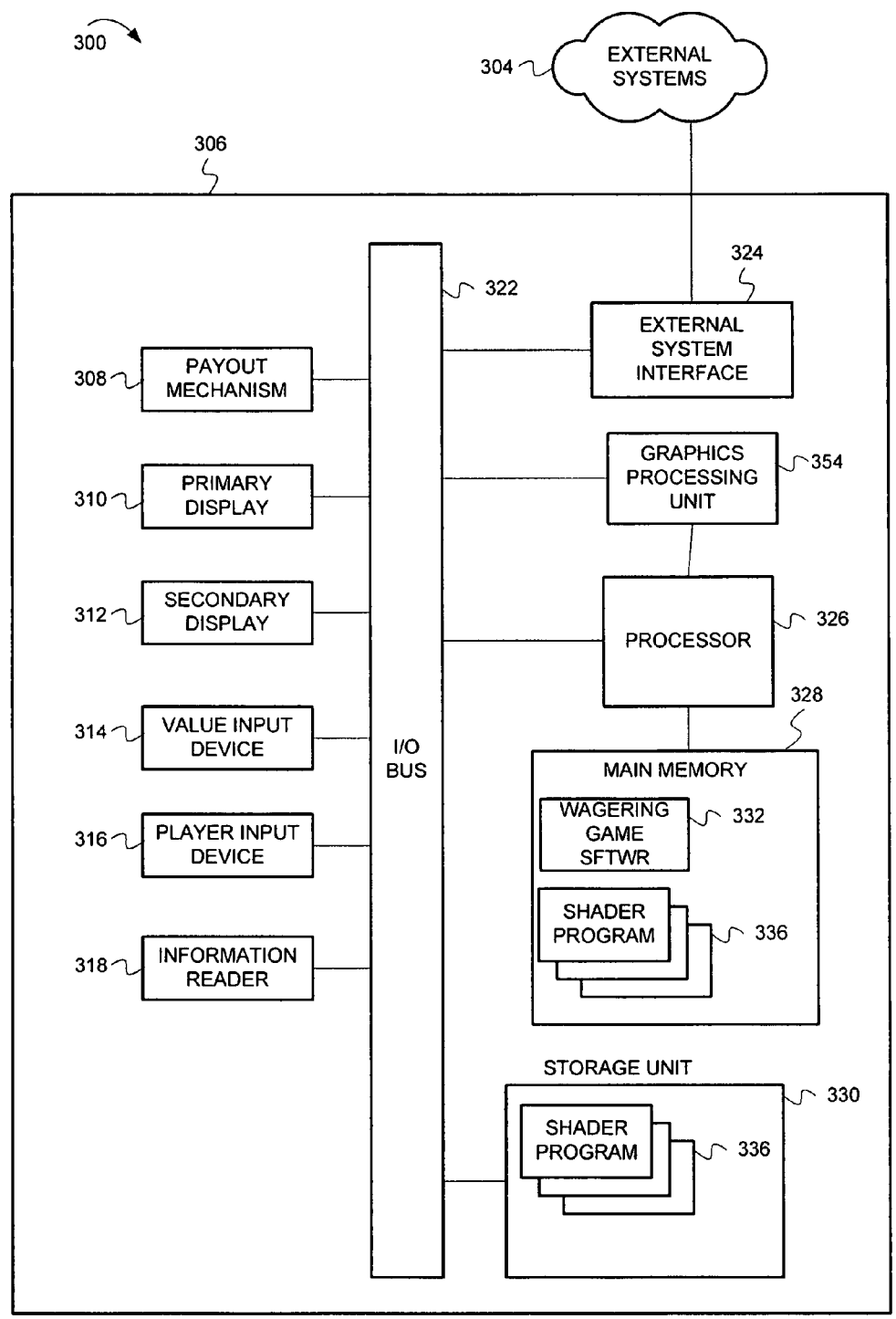
FIG. 3A is a block diagram of an architecture, including a control system, for a wagering game machine according to an example embodiment.

FIG. 3A is a block diagram illustrating a wagering game machine architecture 300, including a control system, according to example embodiments of the invention. As shown in FIG. 3A, the wagering game machine 306 includes a central processing unit (processor) 326 connected to main memory 328, which may store wagering game software 332. In one embodiment, the wagering game software can include software associated with presenting wagering games, such as video poker, video blackjack, video slots, video lottery, etc., in whole or part. In addition, wagering game software 332 may include bonus rounds, themes, advertising content, attract mode content, pay tables, denomination tables, audio files, video files, operating system files and other software associated with a wagering game or the operation of a wagering game machine.

The processor 326 is also connected to an input/output (I/O) bus 322, which facilitates communication between the wagering game machine's components. The I/O bus 322 may be connected to a payout mechanism 308, primary display 310, secondary display 312, value input device 314, player input device 316, information reader 318, and/or storage unit 330. The player input device 316 can include the value input device 314 to the extent the player input device 316 is used to place wagers. The I/O bus 322 may also be connected to an external system interface 324, which is connected to external systems 304 (e.g., wagering game networks).

In general, graphics processing unit 354 processes three-dimensional graphics data and may be included as part of primary display 310 and/or secondary display 312. Graphics processing unit 354 includes components that may be used to provide a real-time three-dimensional rendering of a three-dimensional space based on input data. Various graphics engines are known in the art and may be used in various embodiments of the invention. In some embodiments, the graphics engine comprises a RenderWare graphics engine, available from Criterion Software. Graphics processing unit 354 may be implemented in software, hardware, or a combination of software and hardware.

In some embodiments, graphics processing unit 354 provides a set of one or more components that provide real-time three dimensional computer graphics for a wagering game application or other software running on a wagering game machine. Graphics processing unit 354 may also be referred to as a game engine. In some embodiments, graphics processing unit 354 provides an underlying set of technologies in an operating system independent manner such that a wagering game may be easily adapted to run on multiple platforms, including various hardware platforms such as stand-alone and portable wagering game machines and various software platforms such as Linux, UNIX, Mac OS X and Microsoft Windows families of operating systems. In some embodiments, graphics processing unit 354 may include various combinations of one or more components such as a rendering engine ("renderer") for two dimensional or three dimensional graphics, a physics engine and/or components providing collision detection, sound, scripting, animation, artificial intelligence, networking, and scene graphs. A scene graph is generally considered to be an object-oriented representation of a three dimensional game world and is designed for efficient rendering of vast virtual worlds. Thus in various embodiments, a real-time rendering of a three-dimensional model such as a scene graph is provided for a wagering game application or other software operating on a wagering game machine.

The components described above may be implemented in various combinations of software, hardware and/or firmware. Further, while shown as part of a control system 300 for a wagering game machine, graphics processing unit 354 or portions thereof may reside on systems external to the wagering game machine, such as on a game server.

In some embodiments, the components of graphics processing unit 354 may be replaced or extended with more specialized components. For example, in particular embodiments, graphics processing unit 354 may be provided as a series of loosely connected components that can be selectively combined to create a custom graphics engine for a wagering game application.

As noted above, various components may be present in a graphics processing unit 354. Some graphics engines provide real-time 3D rendering capabilities while other components outside of the graphics engine provide other functionality used by wagering games. These types of graphics engines 340 may be referred to as a "rendering engine," or "3D engine".

In some embodiments, the graphics processing unit 354 may utilize and be designed substantially in accordance with various versions of a graphics API such as Direct3D or OpenGL which provides a software abstraction of a graphics processing unit or video card. Further, in some embodiments, low-level libraries such as DirectX, SDL (Simple DirectMedia Layer), and OpenAL may also be used in presenting a wagering game in order to assist in providing hardware-independent access to other computer hardware such as input devices (mouse, keyboard, and joystick), network cards, and sound cards.

Wagering game software 332 may be loaded from storage unit 330, or it may be loaded from external systems 304 such as servers of other systems on a wagering game network (illustrated further in FIG. 2). In general, wagering game software 332 comprises modules or units that operate to present one or more wagering game upon which monetary value may be wagered. During the course of presenting the wagering games, images composed of graphical objects are displayed on primary display 310 and/or secondary display 312. The graphical objects may represent various wagering game elements such as reels, cards, dice, symbols, animations, etc., and may also represent elements of a bonus round or other ancillary wagering game software component.

Storage unit 330 and/or main memory 328 may store a shader program 336. Shader program 336 comprises a program that is designed to operate on a graphics processor 354 that may coupled to one or both of primary display 310 or secondary display 312. Shader programs 336 may also be received from an external system 304, for example via external system interface 324. In general, shader program 336 may be downloaded to the graphics processor for execution on the graphics processor, and provides commands and/or data that control the rendering of graphical objects processed by the graphics processing unit. The shader program may apply graphical characteristics such as texture, shadowing, lighting etc. to graphical objects rendered by the graphics processing unit. Further details on the operation of shader programs on a graphics processor are provided below.

Some embodiments of the invention include an audio subsystem 320. Audio subsystem 320 provides audio capabilities to the wagering game machine and may comprise an audio amplifier coupled to speakers or an audio jack, and may further include an audio programming source on a memory such as a CD, DVD, flash memory etc.

In one embodiment, the wagering game machine 306 can include additional peripheral devices and/or more than one of each component shown in FIG. 3. For example, the peripherals may include a bill validator, a printer, a coin hopper, a button panel, or any of the many peripherals now found in wagering game machines or developed in the future. Further, in some embodiments, the wagering game machine 306 can include multiple external system interfaces 324 and multiple processors 326. In one embodiment, any of the components can be integrated or subdivided. Additionally, in one embodiment, the components of the wagering game machine 306 can be interconnected according to any suitable interconnection architecture (e.g., directly connected, hypercube, etc.).

In one embodiment, any of the components of the wagering game machine architecture 300 (e.g., the wagering game presentation unit 332 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 314 or devices coupled through player input device 316, the player may select any variables associated with the wagering game and place his/her wager to purchase a play of the game. In a play of the game, the processor 326 generates at least one random event using a random number generator (RNG) and provides an award to the player for a winning outcome of the random event. Alternatively, the random event may be generated by a remote computer using an RNG or pooling schema and then transmitted to the wagering game machine. The processor 326 operates the display 114 to represent the random event(s) and outcome(s) in a visual form that can be understood by the player. In some embodiments, a wagering game segment may be triggered based on certain events. For example, a bonus round may be triggered.

Figure 3B:
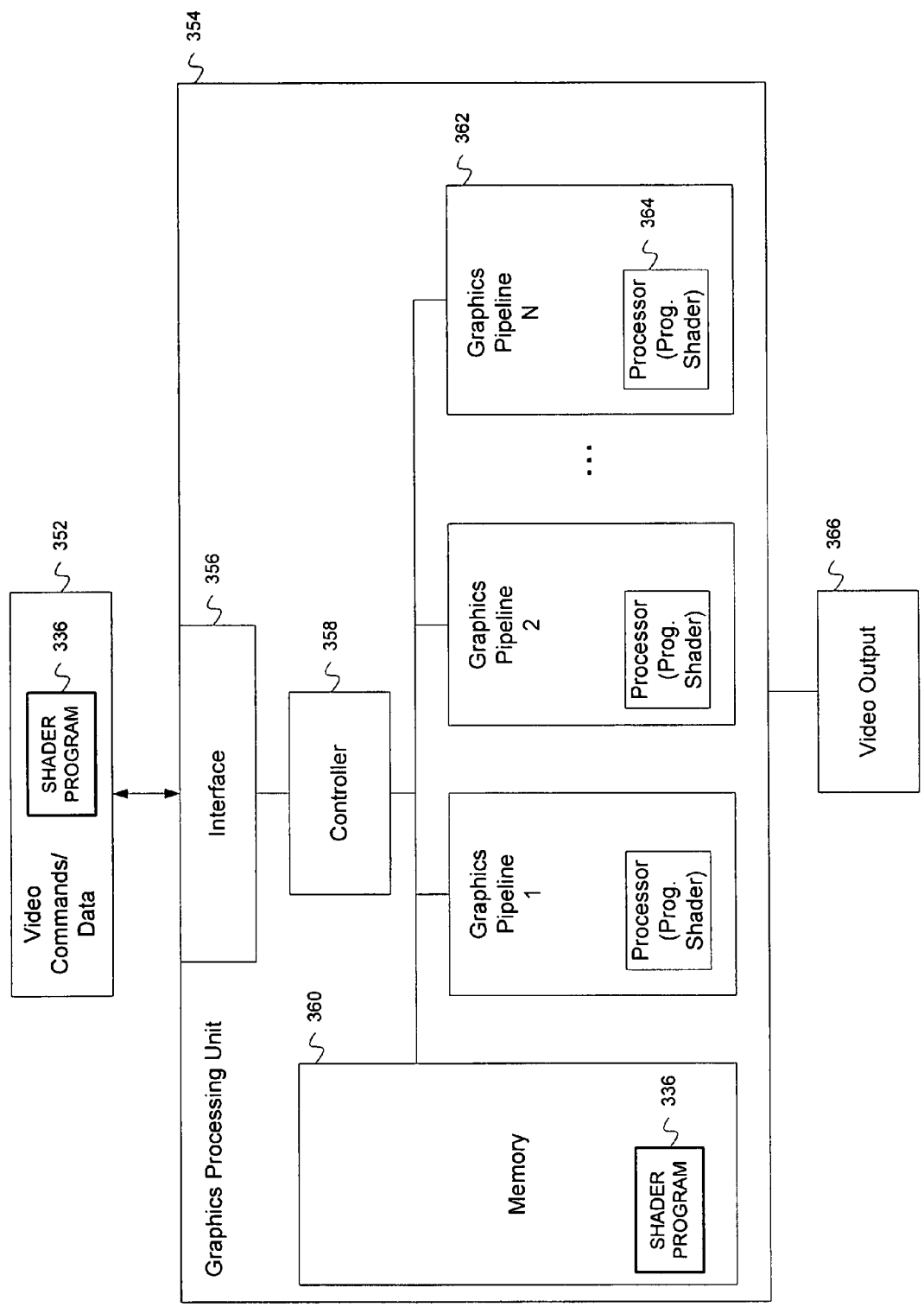
FIG. 3B is a block diagram providing further details of a graphics processing unit of a control system for a wagering game according to an example embodiment.

FIG. 3B is a block diagram illustrating further details of a graphics processing unit 354 according to example embodiments of the invention.

Graphics processing unit 354 receives video commands and data 352 from processor 326 and produces video output 366 for presentation on a display coupled to the graphics processing unit 354. In some embodiments, graphics processing unit 354 includes an interface 356, a controller 358, memory 360 and implements one or more graphics pipelines 362. While the embodiments of the invention are not limited to any particular graphics processing unit 354, some embodiments use a graphics processing unit from the ATI RADEON® family of graphics processing units available from ATI Technologies Inc. of Markham, Ontario Canada. In alternative embodiments, a graphics processing unit from the NVIDIA family of graphics processing units available from NVIDIA Corporation of Santa Clara, Calif.

Interface 356 provides an interface between processor 326 and graphics processing unit 354. Interface 356 may be an I/O (input/output) interface or a bridge device to interface directly to processor 326. Examples of interface 356 include the Intel Northbridge and the Intel Southbridge type interfaces.

Commands/Data 352 received at Interface 356 may be processed by Controller 358. Controller 358 may be a processor used to coordinate and manage processing of video data by the graphics processing unit 354. For example, controller 358 may control the placement of commands and data into memory 360, and may manage commands and data passed to the one or more graphics pipelines 362.

As noted above, graphics processing unit 354 may include one or more graphics pipelines 362. In some embodiments, graphics processing unit may include 48 graphics pipelines 362. The inclusion of multiple graphics pipelines 362 on a graphics processing unit 354 enables graphics commands and data to be processed in parallel.

The graphics pipelines 362 may each include a processor 364. In some embodiments, the processor 364 may be referred to as a programmable shader. It should be noted that other processors may also be included as part of graphics pipeline 362. For example, a geometry processor and/or a rasterizer may also be included in a pipeline 362. Other processors or computation units may be included and may perform a variety of specialized functions that can include table lookups, scalar and vector addition, multiplication, division, coordinate-system mapping, calculation of vector normals, tessellation, calculation of derivatives, interpolation, and the like.

Programmable shader 364 may execute a shader program 336 loaded into memory 360 at run-time by controller 358. The shader program may be received from processor 326 through interface 352. In some embodiments, shader program 336 may be specified in a shader programming language that is proprietary to the graphics processing unit manufacturer. In alternative embodiments, a set or subset of "standardized" graphics operations commands and/or data may be supported. Examples of such standardized operations include various versions of DirectX or OpenGL languages.

The commands and/or data comprising shader program 336 for execution by programmable shader 364 in general include commands and/or data that control various aspects that affect the rendering of final surface properties of graphical objects to be presented on a display of a wagering game machine. For example, shader program 336 may include operations that include the calculation of one or more of: texture mapping, bump mapping, light mapping (light absorption, diffusion, reflection, refraction, shadowing), specular mapping, surface displacement, and other post-processing effects. Various parameters controlling the shading may be passed as parameters to the shader program. For example, the number of lights and lighting parameters (intensity, color etc.) may be passed as parameters to the shader program.

Various embodiments may implement one or various types of programmable shaders depending on the capabilities and requirements of a particular graphical processing unit 354. In general, the various types of programmable shaders include vertex shaders, geometry shaders, and pixel shaders. Multiple types of programmable shaders may exist on a graphics processing unit at the same time.

In general, vertex shaders operate on each vertex in a model containing three-dimensional graphical objects. Vertex shaders define a method to compute vector space transformations and other computations. In some embodiments, vertex type of programmable shader operates on basic data types, so graphical objects composed of complex structures are broken down before being passed to the vertex shader. The vertex shader receives the vertex positions of the graphical object in addition to parameters controlling the shading and positioning of the vertices defining the graphical object or objects. Functions that may be applied to the data include mesh deformation, vertex displacements, and texture coordinate transformations.

In general, pixel shaders may be used to compute pixel properties such as pixel color. Pixel shaders are typically applied for each pixel in a graphical object being processed in the pipeline. As with vertex shaders, various parameters may be supplied to the shader program to control lighting and texture computations applied to the set of pixels through the operation of the shader. For example, the parameters may specify the number, positions, intensities, and colors of one or more lights illuminating the graphical objects in a three-dimensional model.

In general, geometry shaders operate on vertices that may be grouped into primitives such as triangles, lines, strips and points. The vertices may comprise output from a vertex shader. Additionally, geometry shaders may make copies of input primitives, and as a result create new sets of vertices.

As discussed above, various parameters may be supplied to control lighting and shading. In some embodiments, the shaders may implement various types of shading models, including Gouraud shading, Phong shading and/or bump mapping.

In some embodiments, processor 326, graphics processor 354 and/or shader programs 336 may be used alone or in various combinations to produce various three-dimensional transformations and functions for various aspects of a wagering game display. In some embodiments, transformations include, but are not limed to, various combinations of one or more of the following transformations and functions:

Transformations and Functions

In general, the transformations and functions described below involve rendering a scene in real time to a buffer, then post-processing the buffer also in real time. In some embodiments, a general purpose processor may be used to perform the post-processing. In alternative embodiments, a graphics processing unit having performs some or all of the processing. In further alternative embodiments, a graphics processing unit having multiple pipelines and/or shaders performs some or all of the post-processing.

Edge Detection Utilizes a gradient filter comprising a horizontal gradient and a vertical gradient to highlight edges of graphical objects in an image. Sobel edge detection and Canny edge detection are two example edge detection functions that may be used in some embodiments.

Color Space Conversion: Apply transformations to the color space. Examples conversions include sepia tone, color to black and white, negative, HSV, YIQ, etc.

Gaussian Transformation May be used in some embodiments to blur an image. Examples include 3×3 Gaussian Transformation with 10 iterations.

Posterization: Transforms colors in an image to produce a "poster" effect. In some embodiments, an edge preserving Kuwahara filter may be used to "posterize" the image. A 5×5 Kuwahara filter may be used. In some embodiments, edges may be composited on top of the posterized image.

FFT: An image may be rendered using an FFT (Fast Fourier Transformation). In some embodiments, a Cooley and Tukey "Decimation in Time" FFT implementation may be used on a graphics processing unit or shader.

Ripple: Causes a ripple effect to occur where the image is transformation is based applying a sine function based on a ripple frequency and distance from a center point. Ripples may appear as concentric rings of distortion moving across the image. Multiple ripples having multiple center points may be rendered.

Rotation: Some or all of an image may be rotated at user-defined rates of rotation.

Size: Some or all of an image may be scaled larger or smaller.

Mapping Transformation: Some or all of an image may be transformed according to a transformation map. Examples include a Spice Mapping (developed by Pixelan Software), Environment Mapping to achieve a "Fun House Mirror" effect, applying a Bump Map to an Environment Map achieve a "Shower Door" effect.

Background Subtraction: using a live video image, a background image, and a compositing image to superimpose the live image over the compositing image. The live image is subtracted from the background image to determine whether the live image data or compositing image data is to be used in rendering the final image.

Flashlight Filter Achieves a "flashlight" effect where portions of the image appear to be illuminated as if by a beam of a flashlight. Portions of an image that are within a predetermined radius of a center point are rendered, portions of the image that are not within the predetermined radius are either not rendered (e.g. set to black) or rendered differently from the portions within the radius.

Dissolve: The rendered image may appear to eventually "dissolve" away to nothing.

Particle Transformations An image may be rendered by applying transformations to "particles" of an image. For example, a cloth waving and folding may be simulated using textures and particle based transformations. Flames of a fire may also be simulated. The particles of the cloth may be transformed based on laws of particle motion, elasticity, and forces applied to the cloth object.

It should be noted that the above transformations and functions may be chained and sequenced. For example, an image may be rotated, shrunk and edge detected in real time using three pipelines or shaders in succession. The number of transformations that may be chained may be determined by the number of pipelines or shaders in a graphics processing unit.

In addition, external data may be used to drive a transformation. For example, a ripple transformation may be applied based on music that is playing on a wagering game machine.

Figure 4:
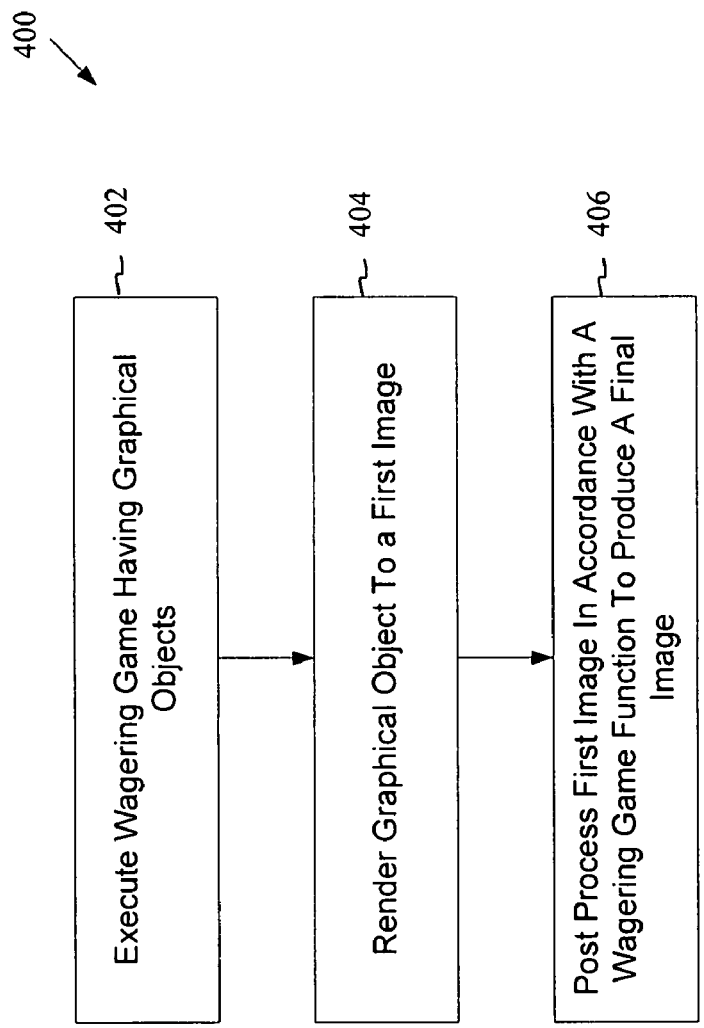
FIG. 4 is a flowchart illustrating methods for providing three-dimensional wagering game effects in wagering game machines according to example embodiments.

FIG. 4 is a flowchart illustrating methods for providing three-dimensional wagering game segments for a wagering game presented on a wagering game machine 100 or portable wagering game machine 200 The methods to be performed by the operating environment constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 4 are inclusive of acts that may be taken by an operating environment executing an exemplary embodiment of the invention.

In some embodiments, the method begins at block 402 by executing a wagering game. The wagering game defines a plurality of graphical objects representing symbols, backgrounds, characters, animations, and other types of graphical objects typical to wagering game machines.

At block 404, the plurality of graphical objects are rendered into a first image. At block 406, the first image is postprocessed according to a wagering game function. That is, the postprocessing provides a graphical affect for a wagering game function. The postprocessed image results in a final image that is presented to the user via a primary or secondary display. The rendering and post processing take place in real time.

Various combinations and associations of postprocessing and wagering game functions are possible. For example, in some embodiments, the wagering game function comprises a transition. Examples of transitions include a transition to a bonus game, a transition to a new episode of a wagering game, a transition from a game select menu to a wagering game, a transition to a screen providing paylines, help info, tutorials, or instruction, or a transition to attract mode. For example, the images for a wagering game may appear to shrink and rotate as the wagering game is replaced by bonus game. Alternatively, the screen image of the wagering game may dissolve to be replaced by an expanding and rotating screen image of the bonus game which stops rotating and expanding when the bonus game is ready for execution.

In alternative embodiments, the wagering game function may comprise revealing an aspect of a wagering game. For instance, a winning hand, reel symbols, a multiplier, or other wagering game aspect may be revealed using the transformations described above. As an example, a flashlight transformation may be used to reveal a symbol.

Alternatively, a particle transformation may be applied to reveal an aspect of a wagering game. For example, a graphical object representing a cloth may be made to appear to wave in the image through particle transformations. The cloth may appear to cover other objects, and may be removed to reveal symbols, multipliers, cards, or other graphical objects for a wagering game. Further, a particle transformation may be used to make flames appear on a symbol. For example, flames may be made to appear on a winning combination of reel symbols, cards or other symbols.

In further alternative embodiments, a wagering game aspect may be highlighted using the transformations described above. For instance, symbols, reels, paylines, held cards, meters, pick areas, dice, or instructional text may be highlighted using the transformations discussed above. As an example, a flashlight or spotlight transformation my highlight winning symbols. The winning symbols may be magnified using a scaling transformation along with a flashlight transformation. A color shimmer effect may be achieved by altering the parameters of a color space transformation.

In further alternative embodiments, an image of a player or other live video may be inserted into the wagering game. For example, a camera may take images of the player, which may then be inserted into the wagering game image using background subtraction transformations similar to "green screening." Additionally, the bits defining a texture may be updated with frames of a video such that the textures appears as a video image. The texture may then be applied to three-dimensional objects so that the video appears to be mapped to the object. Also, a live video may be projected onto the surface of a three-dimensional object such that the video takes on the contours of the three-dimensional object.

Audio data may also modified in accordance with properties of three-dimensional objects. For example, the audio may be modulated in accordance with the position of a three-dimensional object so that the source of the audio appears to move as the object moves. Further, the audio may be modulated in accordance with the size of the object so that the audio becomes louder as the size of an object increases. Other properties of a three-dimensional object such as color, rotation, speed, velocity, acceleration etc. may be used to modulate audio data.

In further alternative embodiments, the wagering game function may comprise spinning reel symbols. The spinning of the reel symbols may be simulated using the transformations described above. In particular, a texture may be mapped, where the texture comprises one or more symbols on a reel. The texture may then be scrolled over time, causing the reel to appear to spin. Simulating the spin of a reel with a texture mapping process is desirable, especially when the graphical processor can perform the texture mapping. Simulating the reel spin using the capabilities of the graphics processor relieves the main processor or processors from having to generate graphics to reflect the reel spin, thereby freeing the processor to perform other functions and allowing for more complex and interesting game play.

In further alternative embodiments, transformations may be used to reduce the amount of memory consumed by symbols, fonts, or other graphical objects used in the wagering game. As an example, a poker game may require that a card be displayed in one style when the card is dealt, and another style to indicate that the card is being held. In conventional systems, two images of the card are used. However, embodiments of the invention may only need one image of the card which is transformed (for example, using a color space transformation) to produce the second image when required. Similarly, one font may be stored, and a transformation applied to the font to produce fonts of varying sizes when displayed.

Figure 5A:
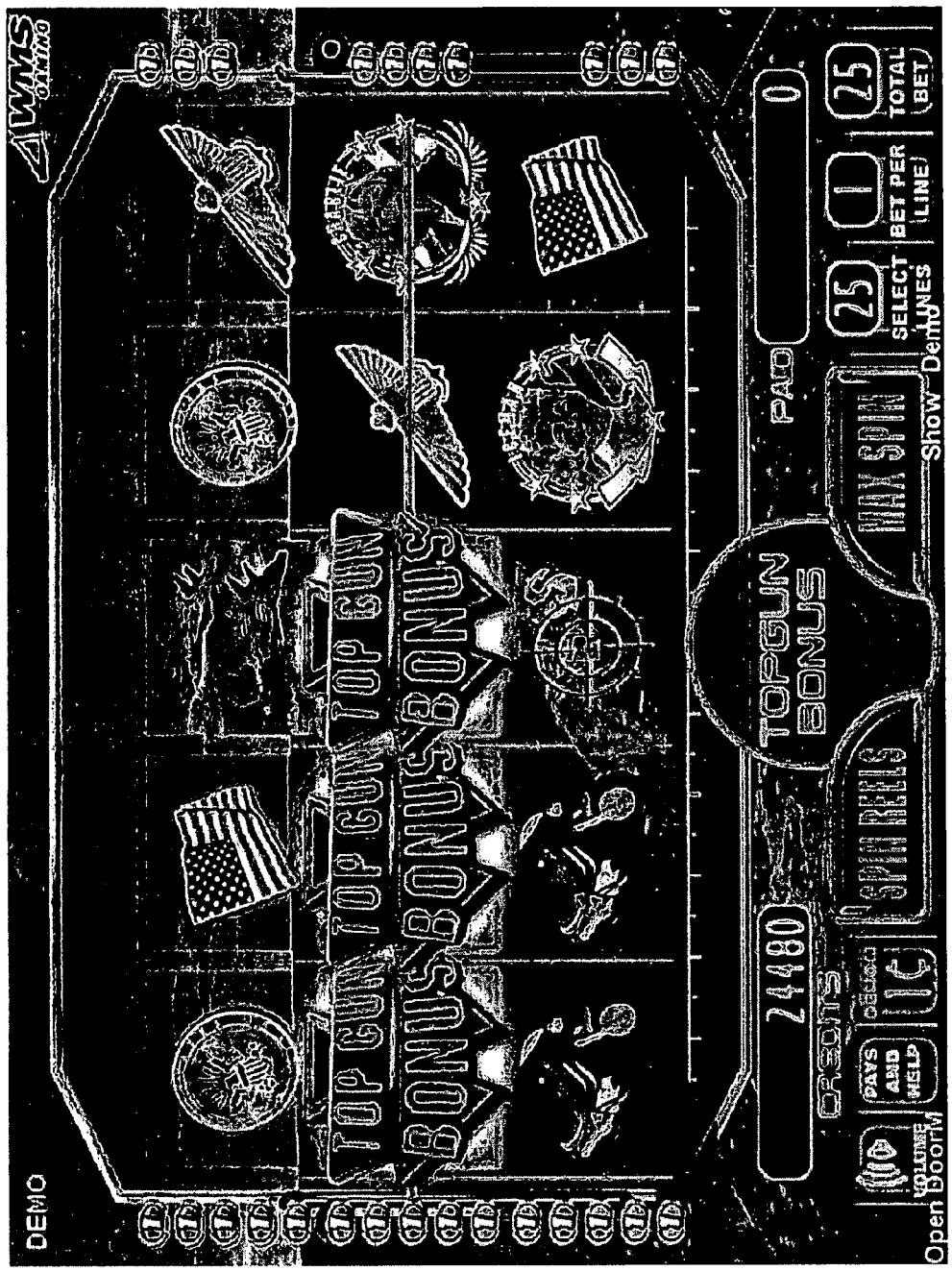
FIGS. 5A-5I are example screen images illustrating the operation of an example embodiment of the invention.

FIGS. 5A-5I present various example screens illustrating the transformations above. FIG. 5A is a baseline image that has not been subject to any postprocessing transformations. FIGS. 5B-5I illustrate transformations applied to the base screen of FIG. 5A.

Figure 5B:

FIG. 5B illustrates a screen image in which edge detection has been applied to the baseline image. The edges of objects in the baseline image are highlighted in white, while non-edge portions of the image are dark.

Figure 5C:
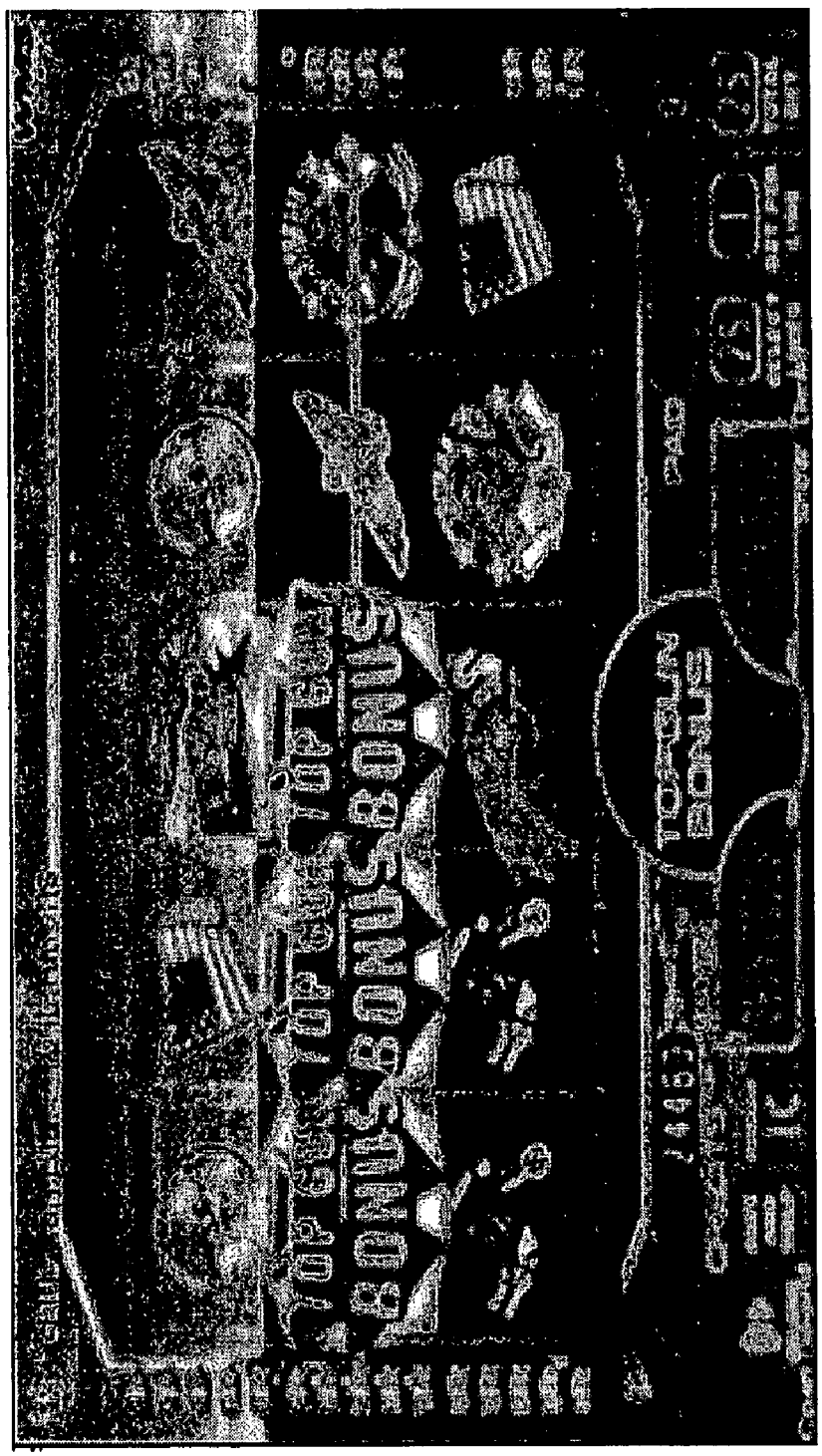

FIG. 5C illustrates a screen image in which a blur filter has been applied to the baseline image. In the example illustrated, a 3×3 Gaussian blur filter with 10 iterations has been performed on the baseline image.

Figure 5D:
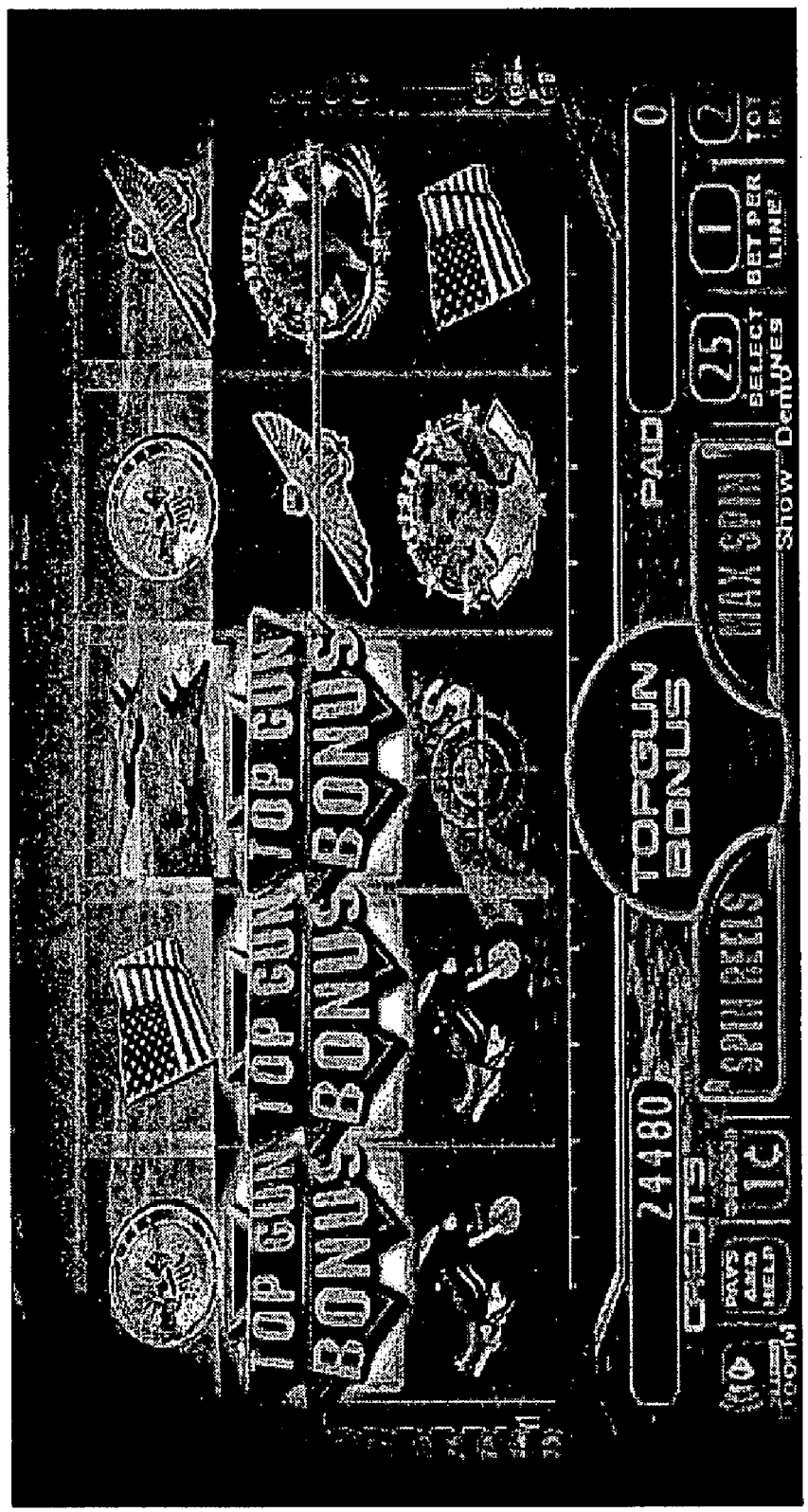

FIG. 5D illustrates a screen image in which a spice transition mapping has been applied to the baseline image.

Figure 5E:
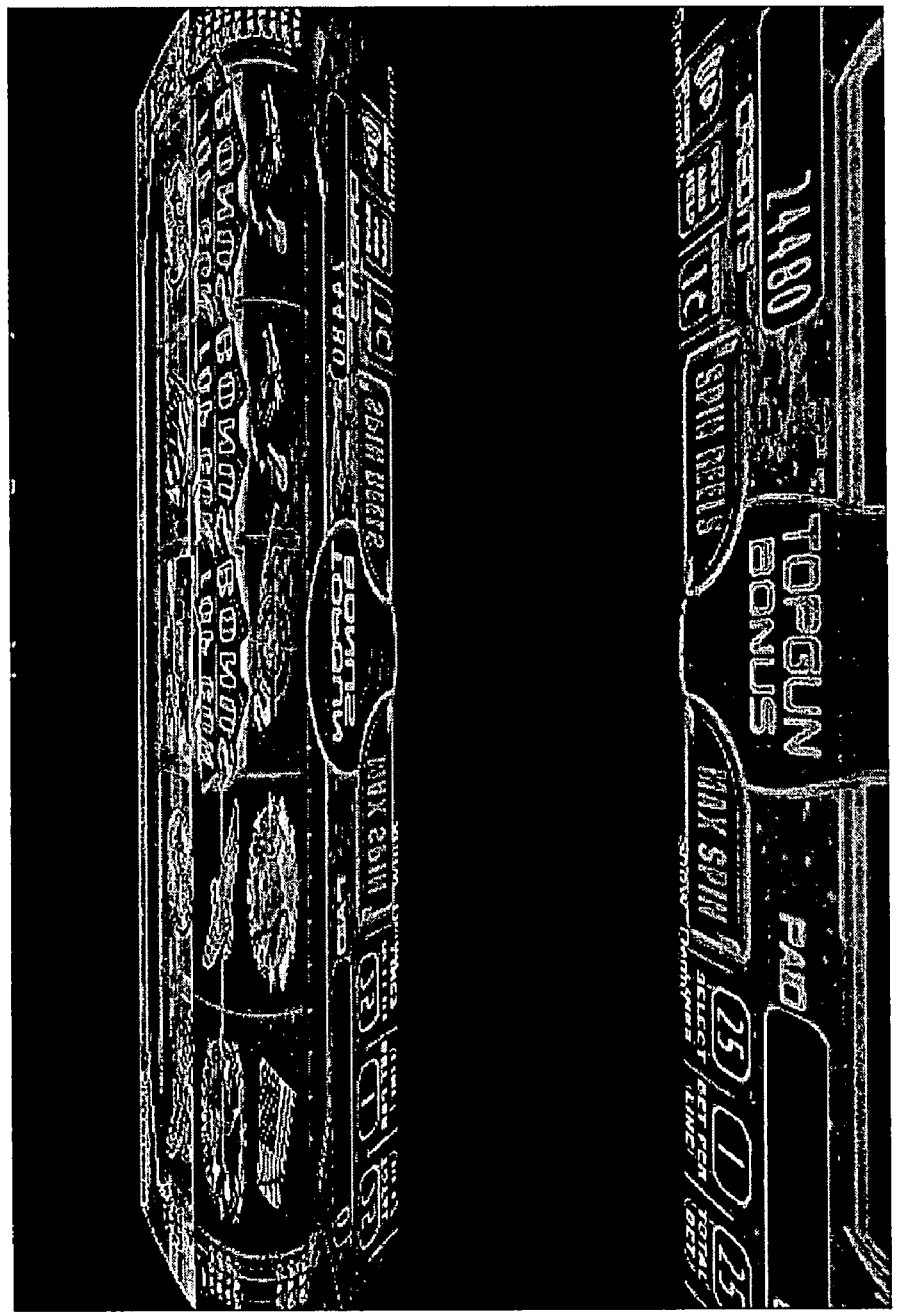

FIG. 5E illustrates a screen image in which a funhouse mirror transformation has been applied to the baseline image. The baseline image is distorted in a manner similar to a funhouse mirror having alternating convex and concave portions.

Figure 5F:

FIG. 5F illustrates a screen image in which a bump map transformation has been applied to an environment map transformation to produce a "shower door" effect for the baseline image.

Figure 5G:

FIG. 5G illustrates a screen image in a ripple transformation has been applied to the baseline image. The center of the ripple is approximately in the center of the example screen image, with ripples appearing to emanate from the ripple center.

Figure 5H:
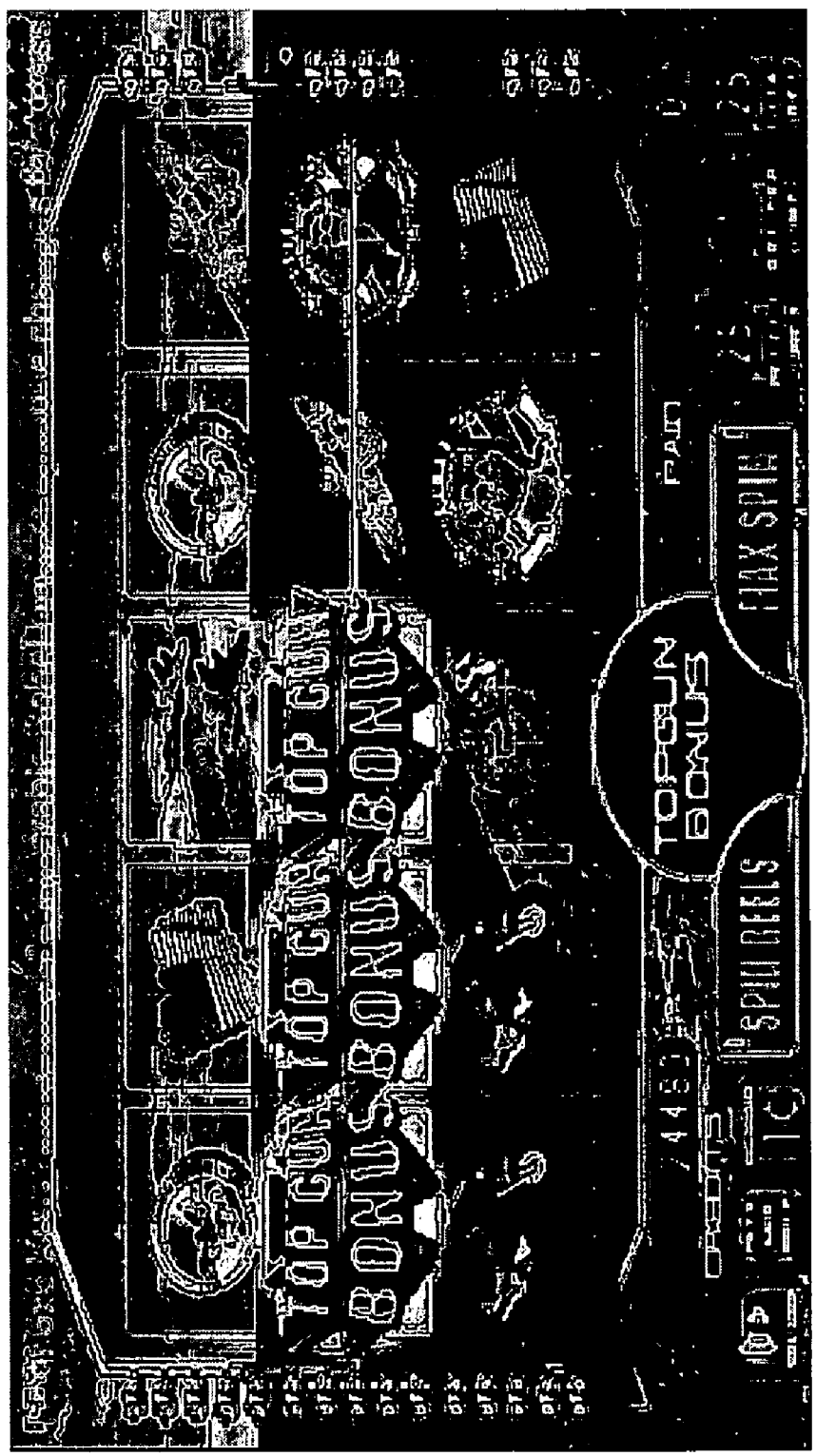

FIG. 5H illustrates a screen image in which a 5×5 Kuwahara filter and a Sobel edge detection transformation has been applied to the baseline image to produce a posterized version of the baseline image.

Figure 5I:
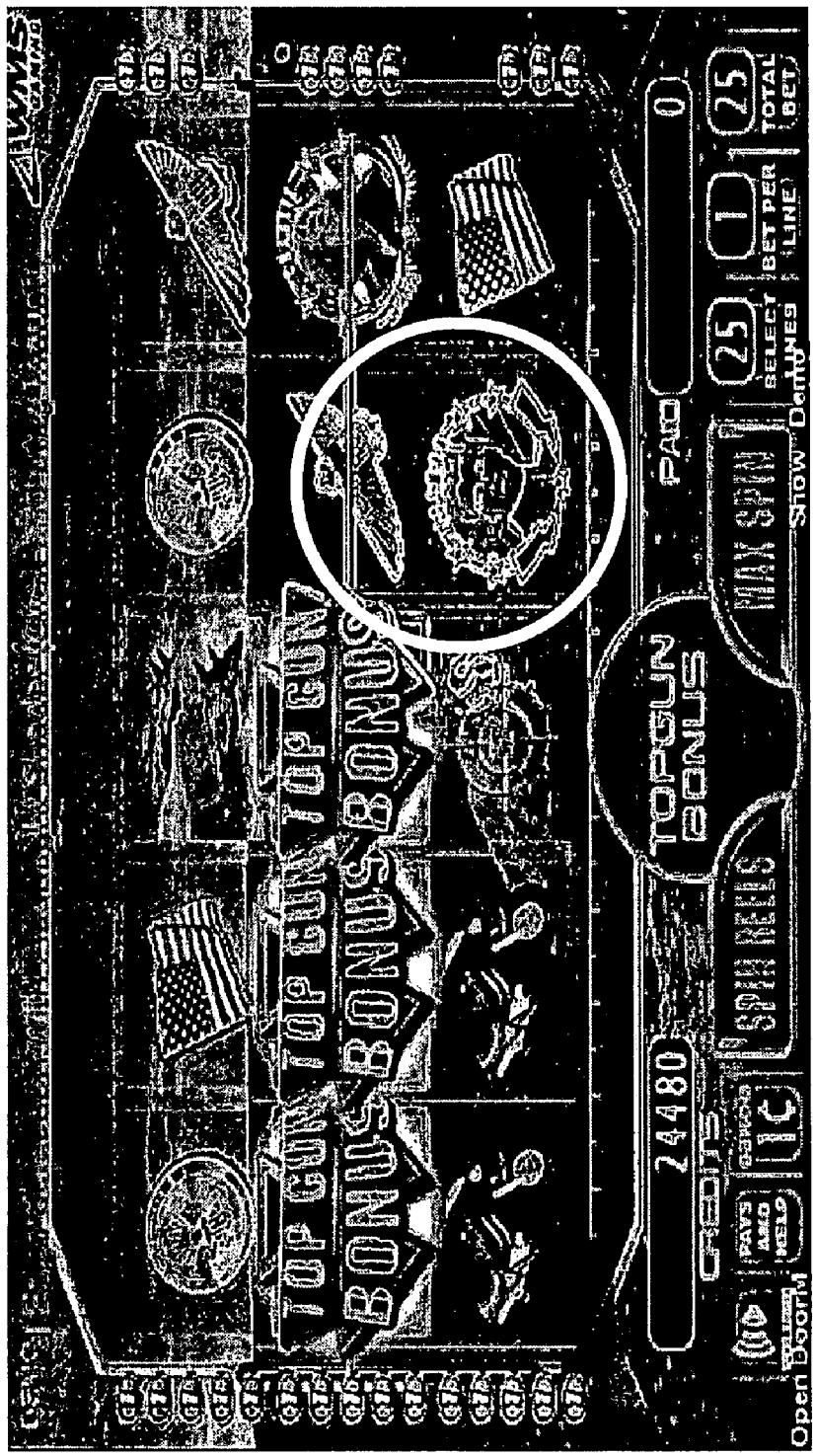

FIG. 5I illustrates a screen image in which edge detection has been combined with a flashlight shader and applied to the baseline image. The flashlight shader limits the edge detection to the area enclosed by the white circle.

It should be noted that the example screen images are snapshots of a screen image at a particular point of time. The images may actually be changing over time and in real time. For example, the edges detected in FIG. 5B may be moving along with moving graphical objects in the scene. Alternatively, the results of the transformation may change with time. For example, in the ripple transformation illustrated in FIG. 5G, the ripples may expand and move through the image over time.

CONCLUSION

Systems and methods for presenting a wagering game segment in which a player navigates through a three-dimensional space on a display of a wagering game machines have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A method of conducting a wagering game on a gaming system, the gaming system including one or more display devices, one or more processors, and at least one memory device, the method comprising:
    executing, via the one or more processors, instructions stored on the at least one memory device that cause the gaming system to initiate the wagering game upon which monetary value may be wagered, the wagering game defining a plurality of three-dimensional graphical objects;
    rendering, in real time via the one or more processors, the plurality of three-dimensional graphical objects to produce a first image;
    displaying the first image on the one or more display devices;
    postprocessing the first image, in real time via the one or more processors, to provide a graphical effect for a wagering game function of the wagering game, the postprocessing including inserting a live video image into the first image by projecting the live video image onto a surface of at least one of the three-dimensional graphical objects of the plurality to produce a final image; and
    displaying the final image on the one or more display devices.

2. The method of claim 1, wherein the wagering game function includes a transition.

3. The method of claim 2, wherein the transition comprises one or more of a transition to a bonus game, a transition to a game episode, a transition from a game selection menu to the wagering game, a transition to a second wagering game, a transition to attract mode, a transition to a help screen, a transition to a payline description, a transition to a tutorial or a transition to game play instructions.

4. The method of claim 1, wherein postprocessing the first image further includes applying one or more transformations, the one or more transformations including a ripple transformation, funhouse mirror transformation, posterization, dissolve, rotation, scaling, color space conversion, iris transformation or FFT.

5. The method of claim 1, wherein the wagering game function includes pick detection and wherein the postprocessing further includes applying an edge detection transformation within a pick region.

6. The method of claim 1, wherein the wagering game function includes revealing a graphical object of the plurality of three-dimensional graphical objects.

7. The method of claim 6, wherein postprocessing the first image further includes one or more of applying a flashlight transformation to reveal the graphical object, removing a shading from the graphical object, applying a particle transformation to a cloth object covering the graphical object, or removing a picture in a picture over the graphical object.

8. The method of claim 7, wherein postprocessing the first image further includes removing the cloth object from the graphical object to reveal the graphical object.

9. The method of claim 7, wherein postprocessing the first image further includes causing a tear to appear in the cloth object over the graphical object.

10. The method of claim 1, wherein the postprocessing further includes performing a background subtraction to inserting the live video image onto bits defining a texture updated with frames of a second video image to produce the final image.

11. The method of claim 1, wherein the postprocessing further includes performing a background subtraction to insert the live video image.

12. The method of claim 1, wherein the postprocessing further includes defining a texture using a frame of the live video image and mapping the texture to the at least one three-dimensional a graphical object of the plurality of graphical objects.

13. The method of claim 1, wherein the wagering game function includes displaying a first symbol and a second symbol, and wherein the postprocessing further includes applying a transformation to the first symbol to produce the second symbol.

14. The method of claim 13, wherein the transformation is one or more of a scaling, rotation, mirror, or color space transformation.

15. The method of claim 1, wherein the postprocessing uses non-graphical data to drive a transformation of the first image to the final image.

16. The method of claim 15, wherein music playing on the game system drives a ripple transformation of the first image to the final image.

17. A gaming system configured to conduct a wagering game, the gaming system comprising:
    one or more display devices;
    one or more processors and
    at least one memory device storing instructions that, when executed by the one or more processors, cause the gaming system to:
        present a wagering game upon which monetary value may be wagered, wherein the wagering game defines a plurality of three-dimensional graphical objects stored in the at least one memory device;
        render, in real time, the plurality of three-dimensional graphical objects to produce a first image;
        display the first image on the one or more display devices;
        postprocess the first image, in real time, to provide a graphical effect for a wagering game function of the wagering game, the postprocessing including inserting a live video image into the first image by projecting the live video image onto a surface of at least one of the three-dimensional graphical objects of the plurality to produce a final image; and
        display the final image on the one or more display devices.

18. The gaming system of claim 17, wherein the wagering game function includes a transition.

19. The gaming system of claim 17, wherein the transition comprises one or more of a transition to a bonus game, a transition to an game episode, a transition from a game selection menu to the wagering game, a transition to a second wagering game, a transition to attract mode, a transition to a help screen, a transition to a payline description, a transition to a tutorial or a transition to game play instructions.

20. The gaming system of claim 18, wherein the graphical effect includes one or more of a ripple transformation, funhouse mirror transformation, posterization, dissolve, rotation, scaling, color space conversion, iris transformation or FFT.

21. The gaming system of claim 17, wherein the wagering game function includes pick detection and wherein the postprocessing applies an edge detection transformation within a pick region.

22. The gaming system of claim 17, wherein the wagering game function reveals a graphical object of the plurality of three-dimensional graphical objects.

23. The gaming system of claim 22, wherein the postprocessing further includes one or more of applying a flashlight transformation to reveal the graphical object, removing a shading from the graphical object, applying a particle transformation to a cloth object covering the graphical object, or removing a picture in a picture over the graphical object.

24. The gaming system of claim 23, wherein the postprocessing further includes removing the cloth object from the graphical object to reveal the graphical object.

25. The gaming system of claim 23, wherein the postprocessing further includes causing a tear to appear in the cloth object over the graphical object.

26. The gaming system of claim 17, wherein postprocessing the first image further includes performing a background subtraction to inserts the live video image onto bits defining a texture updated with frames of a second video image to produce the final image.

27. The gaming system of claim 26, wherein postprocessing the first image includes performing a background subtraction to insert the live video image.

28. The gaming system of claim 17, wherein the wagering-game function displays a first symbol and a second symbol, and wherein the gaming system further postprocesses the first image by applying a transformation to the first symbol to produce the second symbol.

29. The gaming system of claim 28, wherein the transformation includes one or more of a scaling, rotation, mirror, or color space transformation.

30. The gaming system of claim 17, wherein the postprocessing further includes defining a texture using a frame of the live video image and mapping the texture to a graphical object of the plurality of graphical objects.

31. A computer-readable, non-transitory medium having computer executable instructions stored thereon, the instructions, when executed by one or more processors, causing a gaming system to perform a method comprising:
  executing, via the one or more processors, a wagering game upon which monetary value may be wagered, the wagering game defining a plurality of three-dimensional graphical objects;
  rendering, in real time via the one or more processors, the plurality of three-dimensional graphical objects to produce a first image;
  displaying the first image on one or more display devices of the gaming system;
  postprocessing the first image, in real time via the one or more processors, to provide a graphical effect for a wagering game function, the postprocessing including inserting a live video image into the first image by projecting the live video image onto a surface of at least one of the three-dimensional graphical objects of the plurality to produce a final image; and
  displaying the final image on the one or more display devices.

32. The computer-readable medium of claim 31, wherein the postprocessing further includes defining a texture using a frame of the live video image and mapping the texture to a graphical object of the plurality of graphical objects.

33. The computer-readable medium of claim 31, wherein the postprocessing further includes performing a background subtraction to insert the live video image.

34. The computer-readable medium of claim 31, wherein the postprocessing further includes performing a background subtraction to insert the live video image onto bits defining a texture updated with frames of a second video image to produce the final image.

* * * * *

UNITED STATES PATENT AND TRADEMARK OFFICE
CERTIFICATE OF CORRECTION

PATENT NO.       : 8,182,339 B2
APPLICATION NO.  : 12/514889
DATED            : May 22, 2012
INVENTOR(S)      : Anderson et al.

It is certified that error appears in the above-identified patent and that said Letters Patent is hereby corrected as shown below:

On title page 1, in column 2, line 1, under "Other Publications", line 1, after "PCT/US2007/023768", insert --,--, therefor On title page 1, column 2, line 3, under "Other Publications", line 3, after "PCT/US2007/023768", insert --,--, therefor In column 1, line 43, delete "ofbase" and insert --of base--, therefor In column 3, line 65, after "may", delete "be", therefor In column 6, line 13, delete "2-3'"" and insert --2"-3"--, therefor In column 8, line 34, after "may", insert --be--, therefor In column 11, line 10, delete "limed" and insert --limited--, therefor In column 11, line 25, after "Detection", insert --:--, therefor In column 11, line 33, after "Transformation", insert --:--, therefor In column 12, line 1, after "Filter", insert --:--, therefor In column 12, line 10, after "Transformations", insert --:--, therefor In column 13, line 22, delete "my" and insert --may--, therefor In column 13, line 39, after "also", insert --be--, therefor In column 16, line 9, in claim 10, delete "inserting" and insert --insert--, therefor Signed and Sealed this
Second Day of October, 2012

David J. Kappos
*Director of the United States Patent and Trademark Office*

CERTIFICATE OF CORRECTION (continued)
U.S. Pat. No. 8,182,339 B2

In column 16, line 38, in claim 17, delete "processors and" and insert --processors; and--, therefor In column 17, line 27, in claim 26, delete "inserts" and insert --insert--, therefor